C. S. NICKERSON.
TYPE WRITING MACHINE.
APPLICATION FILED NOV. 29, 1904. RENEWED JULY 13, 1908.

913,038.

Patented Feb. 23, 1909.
9 SHEETS—SHEET 1.

C. S. NICKERSON.
TYPE WRITING MACHINE.
APPLICATION FILED NOV. 29, 1904. RENEWED JULY 13, 1908.

913,038.

Patented Feb. 23, 1909.
9 SHEETS—SHEET 7.

C. S. NICKERSON.
TYPE WRITING MACHINE.
APPLICATION FILED NOV. 29, 1904. RENEWED JULY 13, 1908.
913,038.
Patented Feb. 23, 1909.
9 SHEETS—SHEET 8.
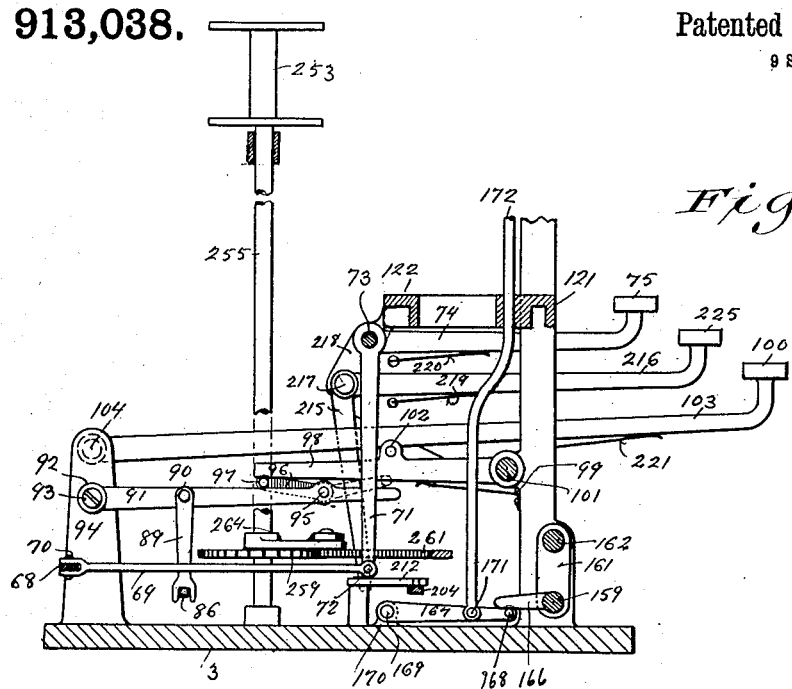
Fig. 9.
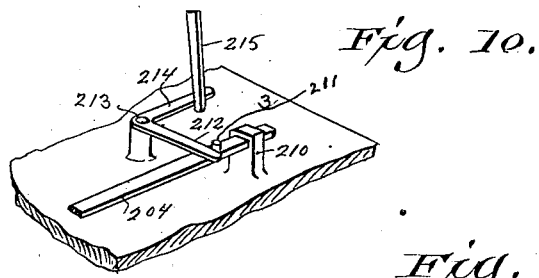
Fig. 10.
Fig. 11.
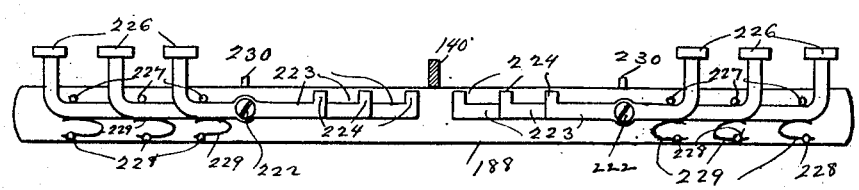
Witnesses
Geo. W. Young.
George Felber.
Inventor
Charles S. Nickerson
By H. G. Underwood
Attorney C. S. NICKERSON.
TYPE WRITING MACHINE.
APPLICATION FILED NOV. 29, 1904. RENEWED JULY 13, 1908.
913,038.
Patented Feb. 23, 1909.
9 SHEETS—SHEET 9.
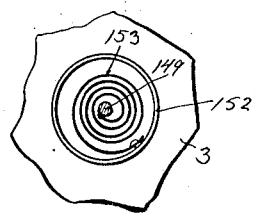
Fig. 14.
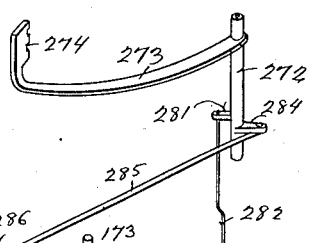
Fig. 12.
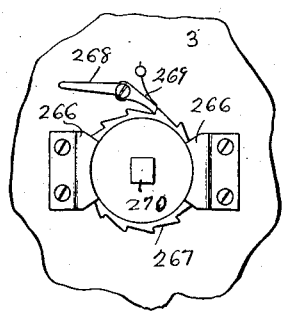
Fig. 15.
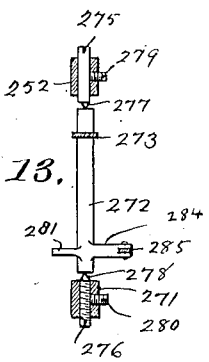
Fig. 13.
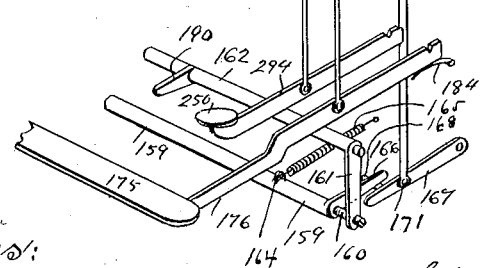

UNITED STATES PATENT OFFICE.

CHARLES S. NICKERSON, OF EVANSVILLE, INDIANA, ASSIGNOR TO NICKERSON TYPEWRITER COMPANY, OF RACINE, WISCONSIN, A CORPORATION OF WISCONSIN.

TYPE-WRITING MACHINE.

No. 913,038.  Specification of Letters Patent.  Patented Feb. 23, 1909.

Application filed November 29, 1904, Serial No. 234,705. Renewed July 13, 1908. Serial No. 443,345.

*To all whom it may concern:*

Be it known that I, CHARLES S. NICKERSON, a citizen of the United States, and resident of Evansville, in the county of Vanderburg and State of Indiana, have invented certain new and useful Improvements in Type-Writing Machines; and I do hereby declare that the following is a full, clear, and exact description thereof.

My invention relates to type-writing machines, and it consists in certain peculiarities of construction and combination of parts, as will be fully set forth hereinafter, in connection with the accompanying drawings, and subsequently claimed.

Figure 1:
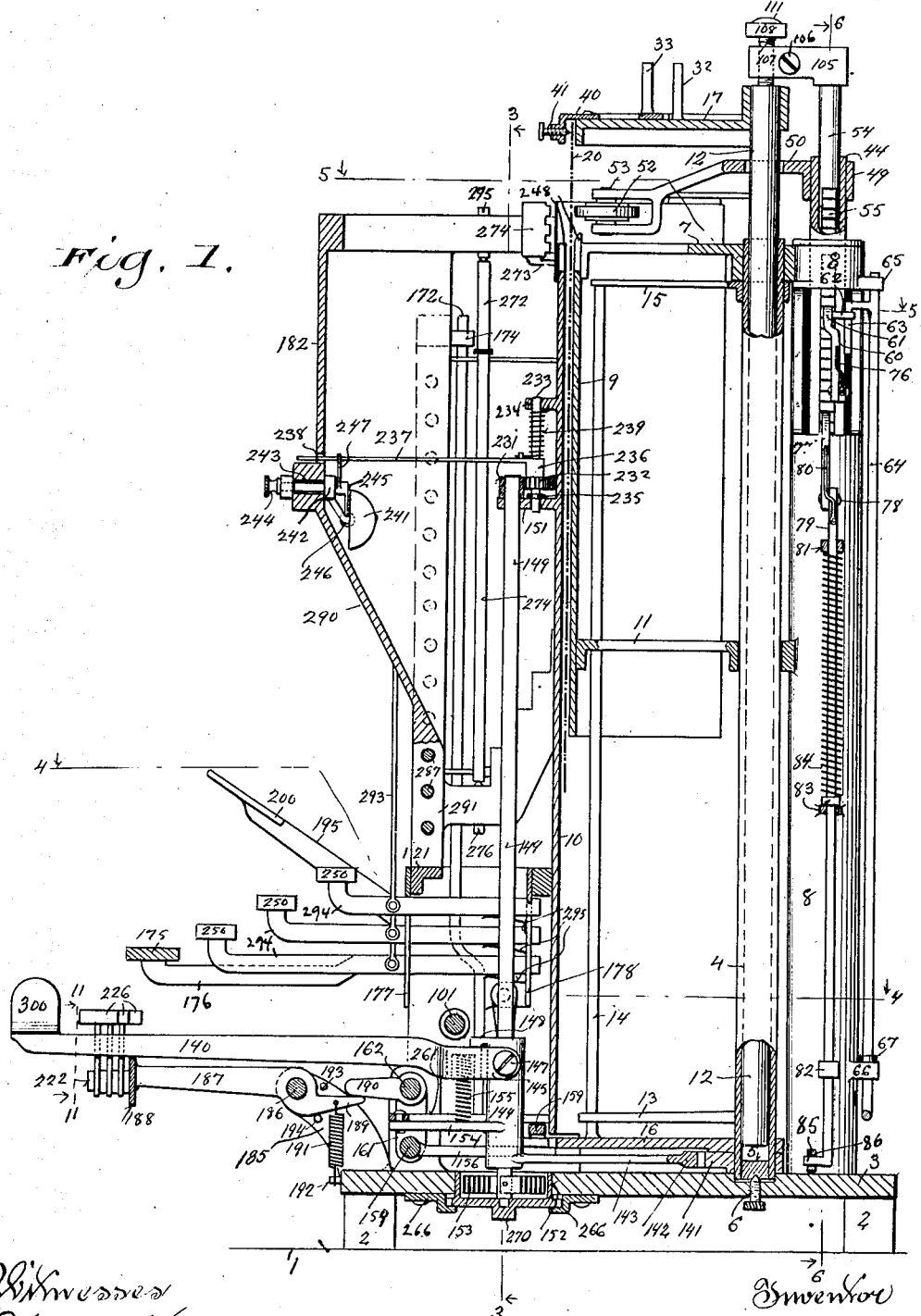
Figure 2:
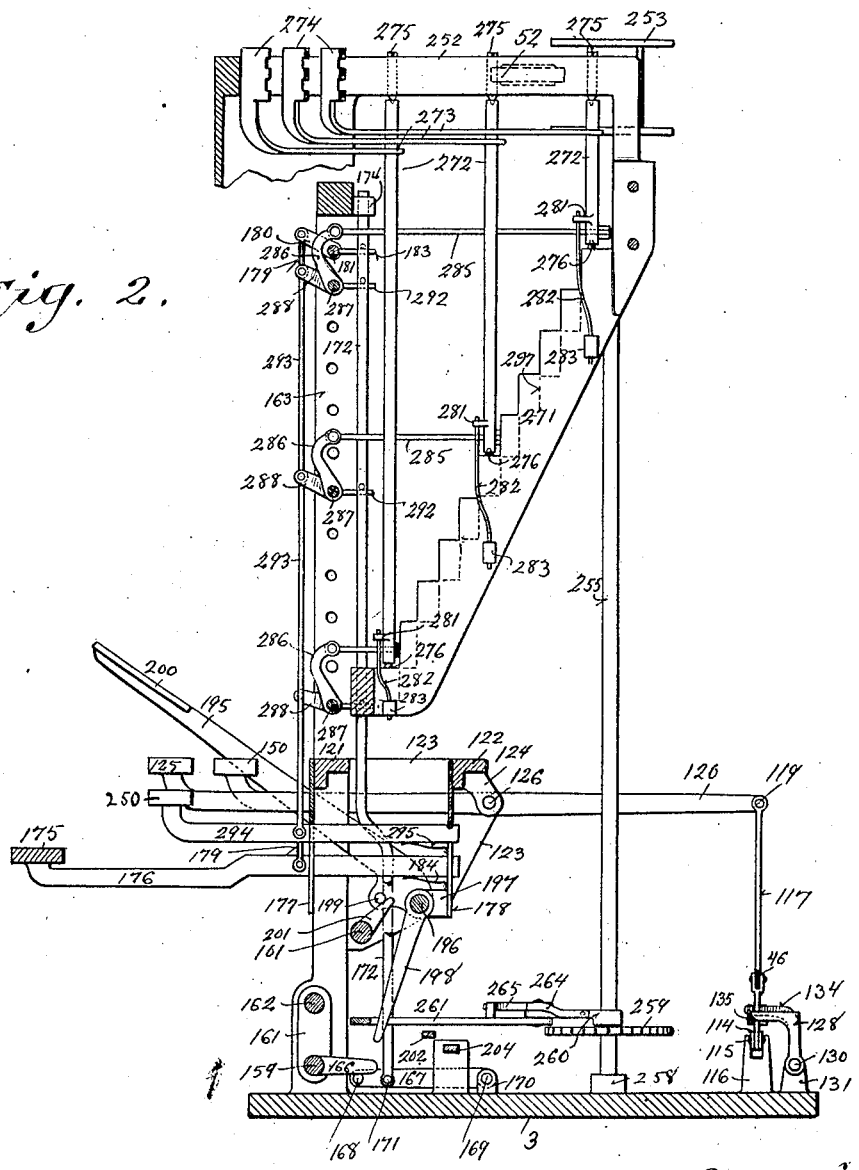
Figure 3:
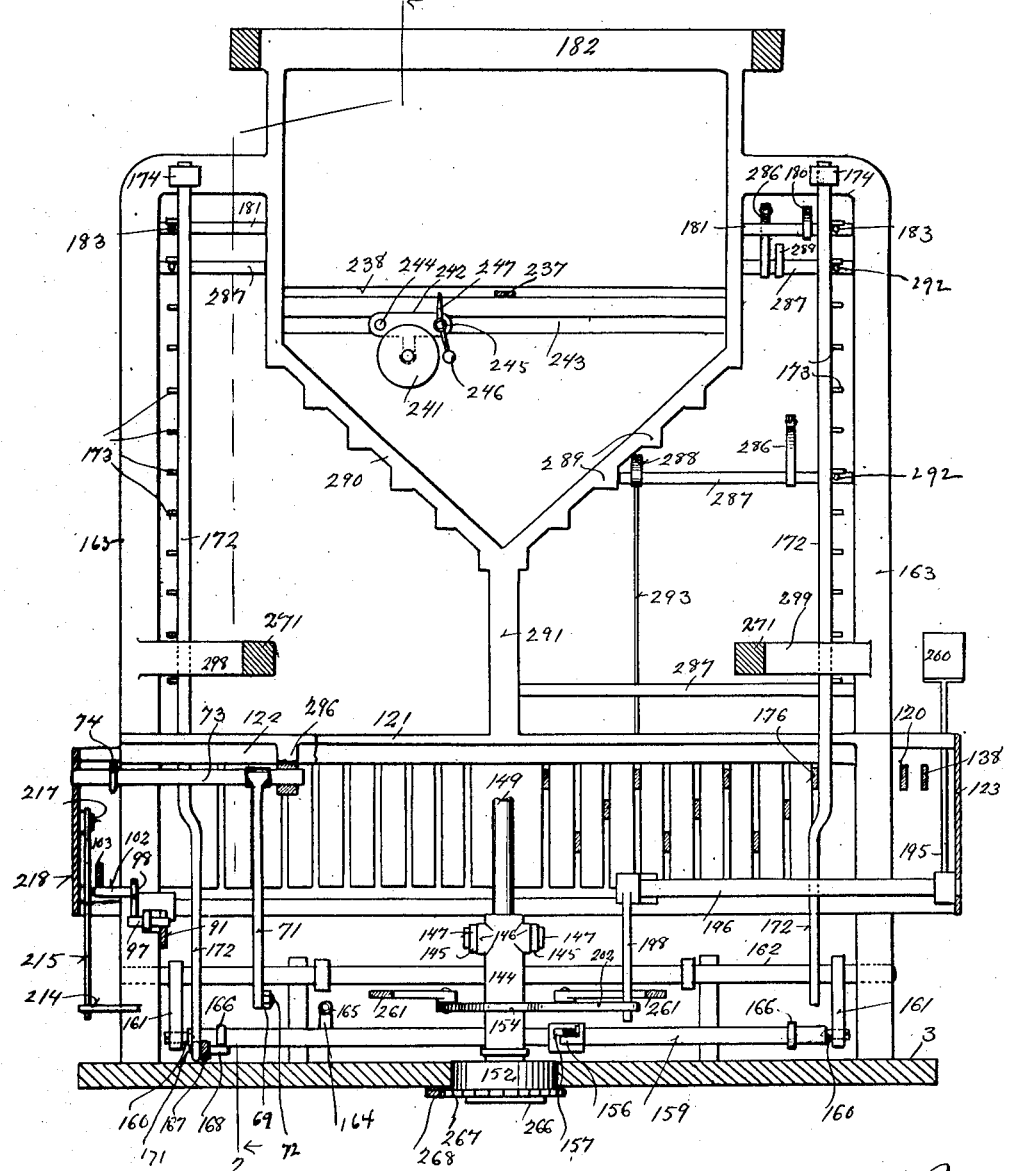
Figure 4:
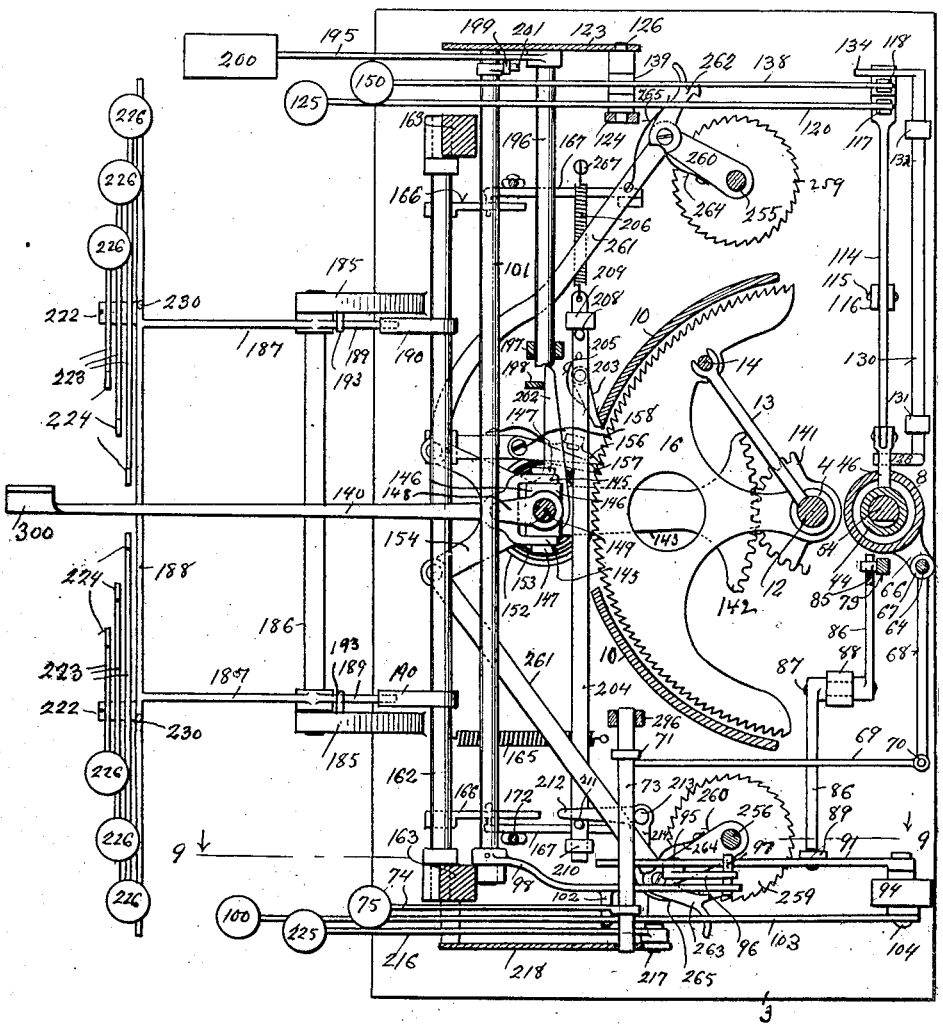
Figure 5:
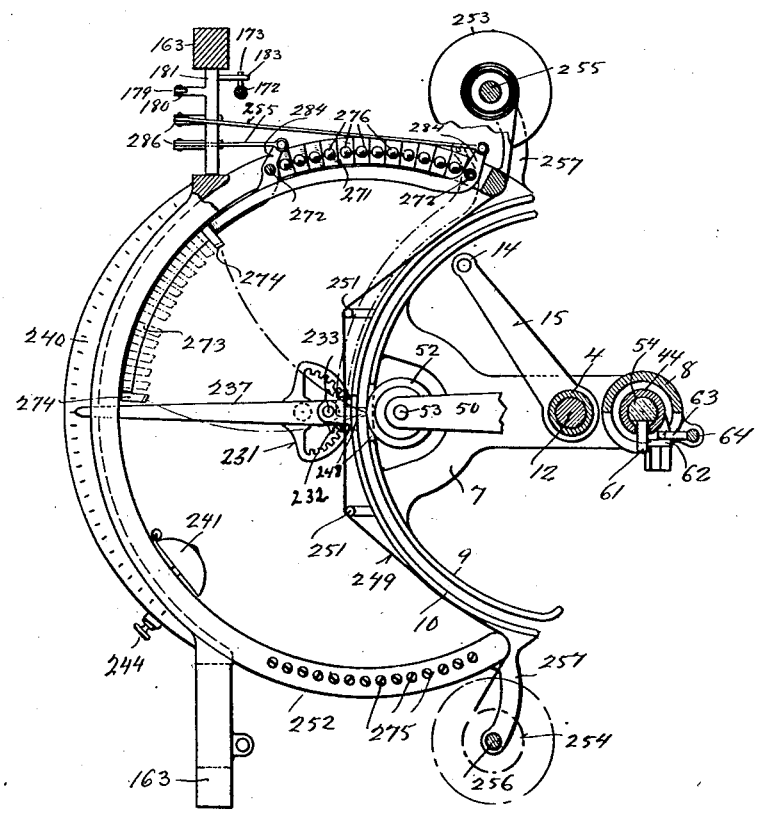
Figure 6:
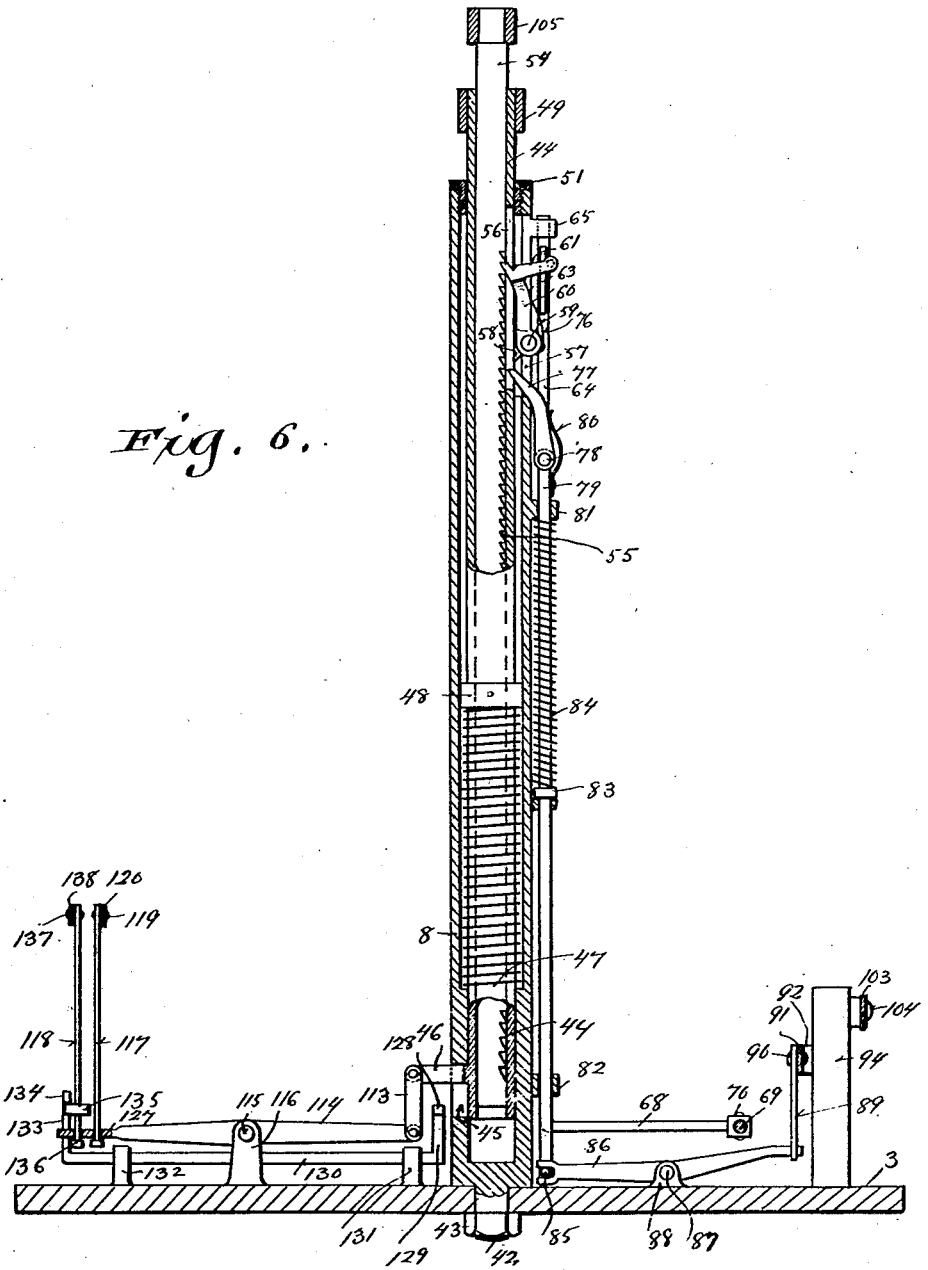
Figure 7:
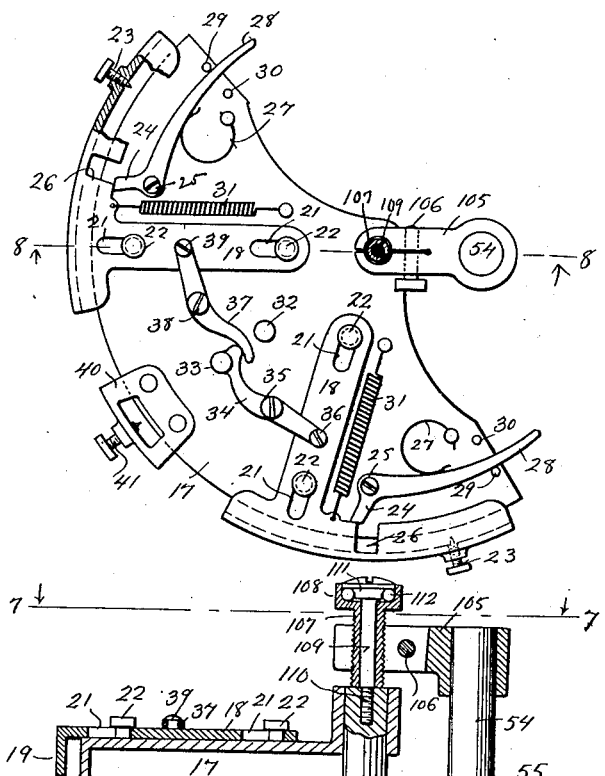
Figure 8:
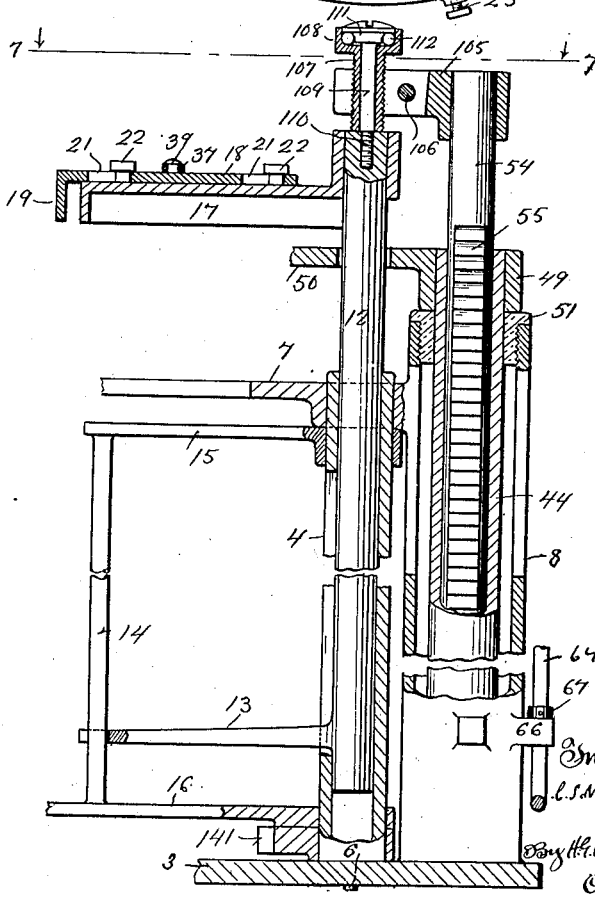

In the said drawings: Figure 1 is a central vertical sectional view of my said machine. Fig. 2 is a vertical sectional view, taken on the line 2—2 of Fig. 3 and illustrates the type-actuating mechanism. Fig. 3 is a view looking from the rear forward, partly in section on the line 3—3 of Fig. 1. Fig. 4 is a sectional plan view, taken on the line 4—4 of Fig. 1. Fig. 5 is a detail plan view, partly in section on the line 5—5 of Fig. 1. Fig. 6 is a detail view of the line spacing mechanism, partly in section on the line 6—6 of Fig. 1. Fig. 7 is a detail plan view of the paper holding mechanism, drawn to an enlarged scale partly in section on line 7—7 of Fig. 8. Fig. 8 is a vertical sectional view, taken on the line 8—8 of Fig. 7. Fig. 9 is a detail sectional view, taken on the line 9—9 of Fig. 4. Fig. 10 is a detail view illustrating the back spacing levers. Fig. 11 is a detail view of the tabulating levers, partially in section on the line 11—11 of Fig. 1. Fig. 12 is a detail perspective view of the key lever mechanism. Fig. 13 is a detail view illustrating the type-adjustment. Figs. 14 and 15 are detail views of the spring and spring barrel which actuate the paper carriage for the purpose of spacing.

Referring by numerals to the said drawings, 1 indicates the surface upon which the machine rests, upon feet 2, 2, depending from the base-plate 3 of the main frame.

4 designates a vertically slotted tube having a plug 5 in its lower end, with a conical hole in its under side, whereby the tube 4 revolves on a conical pointed screw 6, extending through the said base plate, the said tube extending up to a bearing plate 7, which projects forward from a vertical standard 8 rising from the base plate 3. The front end of this bearing-plate 7 has secured thereto the upper end of the suspended inner part 9 of a semi-circular paper holder and guide, whose outer part 10 is fashioned to the base-plate 3. The lower end of the said inner part 9 is supported by a brace 11, extending from the standard 8.

Vertically movable within the tube 4, is a rod 12 having a horizontal arm 13 projecting from a point adjacent to its lower end, through the described vertical slot in said tube 4, said arm 13 being notched at its outer end to receive and slide upon a rod 14, whose upper end is fast to an arm 15 projecting from said slotted tube 4, and whose lower end is fast to a toothed segment 16 fast on the lower end of tube 4 just above the base-plate 3. The upper end of rod 12 carries fast thereon a segment 17 on which are supported a pair of movable plates 18, 18, which are formed with arc-shaped downward flanges 19, 19, at their outer ends projecting over the semi circular edge of the said segment, to receive the upper ends of the sheet of paper (indicated at dotted lines at 20 in Fig. 1) which is to be written on by the machine. Each plate 18, has guide slots 21, 21, through which there pass the shanks of guide-screws 22, 22, and the flanges 19 have screws 23 passing therethrough, with pointed ends to push through and securely hold the paper 20 when same has been clamped between said flanges and the adjacent edge of the segment 17.

24, 24, designate the heads of triggers, pivoted as shown at 25, 25, to said segment, which when the parts are in the positions best shown in Fig. 7 are held against the inner edges of the upper arc-shaped portions of the plates 18, 18, adjacent to the recesses 26, 26, therein, by the springs 27, 27, which are secured to the segment 17 and whose free ends bear against the lever-handles 28, 28, of said triggers 24, 24, the said lever-handles being thereby forced against pins 29, 29, on the segment, thus affording the necessary space for the reception of the upper edge of the paper 20. When this has been done the lever handles 28, 28, are pulled toward each other against the pins 30, 30, when the heads 24, 24, of the triggers will be received in the recesses 26, 26, and then the retracting springs 31, 31, will instantly draw the plates 18, 18, inward, and their flanged ends 19, 19, clamp the paper against the adjacent flanged edge of the segment 17 after which the screws 23, 23, are turned so that their needle points may punch through the sheet of paper, and absolutely prevent it from slipping. In order to free the paper, the clamping plates 18, 18, must be restored to the position shown in the drawings, and this is accomplished in the manner now to be described.

32 designates a stationary pin or lug rising from the segment 17, and 33 is a like pin or lug rising from the free end of a bent lever 34, pivoted at 35 to the segment 17 and at 36 to one of the plates 18. 37 designates another bent lever, pivoted at 38 to said segment and at 39 to the other plate 18, the free ends of these levers being in contact or engagement with each other, and when the flanges 19 are clamped against the semi-circular edge of the segment 17, with the sheet of paper 20 between their adjacent surfaces, and it is desired to free the said sheet, the pin or lug 33 is drawn toward the pin or lug 32, which forces the clamping plates 18, 18, outward, so that the trigger heads 24, 24, are withdrawn from the recesses 26, 26, and the springs 27, 27, force the trigger lever handles 28, 28, against the pins 29, 29, which cause said trigger-heads to move to the positions shown in Fig. 7, just beyond the edge of the walls of the slots 26, 26, so that the triggers will be caught and held in said position until their lever handles are again drawn towards each other, as heretofore described. In the use of narrow strips of paper, postal cards and the like, it is sometimes desirable to employ an additional clamp, for which purpose an extra clamp is provided, consisting of the flanged plate 40 rigidly secured to the segment 17, at a point intermediate of the plates 18, 18, the downward flange of this plate 40 being provided with a needle-pointed screw 41, like the screws 23, 23, heretofore named.

The described standard 8 is best shown, in section, in Fig. 6, the lower end 42 of said standard being reduced in diameter and screw-threaded and passed through a hole in the base plate 3, and held in place by a nut 43; above this point the said standard is hollow, for the reception of a tube 44, which passes up entirely through said standard and for a short distance above the top thereof. The standard 8 is formed with a slot 45 in its lower portion, through which there passes an arm 46, which projects from the described tube 44, and has play the length of said slot or partly so, as required. At this point the tube 44 fits snugly in the bore of the standard 8, but just above this the said bore is increased in diameter to receive a spiral spring 47, which surrounds said tube 44, the upper end of this spring bearing against a collar 48 on said tube 44, which spring keeps said tube normally elevated, as shown in Fig. 6, the boss 49 at the top of the tube 44, being here shown as raised above a bushing 51 fitting in the top of the standard bore, but being capable of being brought down into contact with said bushing when the tube is depressed so that its arm 46 is at the base of slot 45, as shown in Fig. 8. The boss 49 has an arm 50 projecting therefrom (through a hole in which arm the rod 12 passes) and said arm carries at its end (which is preferably forked, as shown in Fig. 1) a wheel 52, covered with india-rubber, and which forms the platen of the machine, said wheel being shown mounted on a vertical pin 53, and in the forked end of the arm 50. Within the tube 44 is the line-spacing rod 54, which is provided, for the greater part of its length with rack-teeth 55, in a continuous series. The upper part of the tube 44 is slotted, as shown at 56, and the corresponding part of the hollow standard 8 is slotted as shown at 57. The tube 44 has a lug 58, and attached to this lug, by pivot 59, is a detent pawl 60 held by spring 76 in engagement with the rack-teeth 55, and extending out from the upper end of pawl 60 is an arm 61 carrying a lateral pin 62, said pin being in the path of the vertical arm of an angle lever 63, whose horizontal arm is connected to a vertically arranged rod 64, and when this rod is rotated for a slight distance, the angle lever 63, by pushing against pin 62, will force the detent pawl 60 out of engagement with the rack-teeth 55 and permit the rod 54 to drop by gravity to its lowest position. This rod 64 has its upper bearing in a lug 65 on the standard 8 and its lower bearing in a lug 66 in said standard, above which the said rod is shown carrying a collar 67, and below this point the rod 64 is rigidly secured to a horizontal arm 68, to which a connecting rod 69 is pivotally connected by pivot bolt 70, and to the other end of said connecting rod 69, the lower end of a vertically arranged lever 71 is connected by pivot bolt 72, the upper end of the lever 71 being rigidly connected to a rock-shaft 73, which passes through said lever, and to the said rock-shaft there is rigidly attached the inner end of the key-lever 74 of the release key 75. Hence, by pressing on this key, the shaft 73 will be rocked, and the vertical rod 64 turned, so as to withdraw detent pawl 60 from the rack-teeth 55 of rod 54, and permit the latter to drop, as already stated.

In order to lift the rod 54 for line spacing, a push pawl 77 is shown for engagement with the rack-teeth 55 on said rod, said pawl 77 being pivoted by pivot bolt 78 to the upper end of vertical rod 79, and at the proper times forced against said teeth by spring 80 on said rod 79. This rod is held in place by perforated lugs 81, 82, on the standard 8, through which lugs it passes and it carries a collar 83, between which and the underside of lug 81 it is shown surrounded by a spiral spring 84, so as to normally hold rod 79 at its lowest point, and thus keep the point of the push-pawl 77 out of engagement with the rack-teeth 55. As the said rod 79 is depressed by the action of the spring 84, this draws down the pawl 77 over the bottom wall of the slot 57 in standard 8, which thus withdraws the point of said pawl 77 from engagement with the rack-teeth 55, as best shown in Fig. 6. The lower end of rod 79 is formed with a foot 85, which is shown as being received by the forked end of lever 86, the latter being centrally fulcrumed on pivot bolt 87, to lug 88 on the base-plate 3, the other end of this lever 86 being received in the forked lower end of a vertical arm 89 pivotally suspended by pivot bolt 90 to lever 91, whose hub 92 is pivotally connected by pivot bolt 93, to post 94, rising from the base-plate 3. By depressing lever 91, the rod 54 is raised by the engagement of push-pawl 77 on rod 79 with the rack-teeth 55.

Pivoted to lever 91, by pivot-bolt 95 is a crank 96 carrying a laterally projecting pin 97 which rests on said lever 91, and above this pin, and resting on it, is the free end of lever 98 supported by spring 99, and whose other end has a hub that is fast on a transverse shaft 101, which extends entirely across the machine and is supported in the frame-work thereof. This lever 98 carries, at about its center, a laterally projecting pin 102, and key-lever 103, of line space key 100, is pivoted at 104 to post 94 and rests on said pin 102, so that by depressing line-space key 100 the lever 98 is depressed, and by it, through pin 97, lever 91 is depressed, and consequently arm 89 and adjacent end of lever 86, which raises the other end of lever 86 and with it rod 79, and its push-pawl 77. As the latter rises above the bottom wall of slot 57, the spring 80 forces said push pawl inward, and its point engages with the adjacent tooth of rack-teeth 55, and raises the line spacing rod 54, one or two line spaces, according to the position of pin 97 on crank 96. In the position of said pin 97 shown in full lines in Fig. 9, this action will raise rod 54 two line spaces but if the crank 96 and its pin 97 is thrown over to the position shown in dotted lines in said Fig. 9, the rod 54 will be raised only one line space.

Brazed or otherwise rigidly fastened to the upper end of rod 54 is one end of a clamp 105, the other end being split, as best shown in Fig. 7, this split end being further formed with a screw-threaded bore (half in each half of the split end) and while said two halves of the split end may be held firmly together by the spring or elasticity of the metal itself, I have shown a binding screw 106 for tightly drawing them together. The described bore in the clamp is for the reception of a hollow screw 107, having an enlarged hollow open head 108, this screw 107 having a smooth bore through which a screw 109 is passed, this latter screw having a smooth shank just fitting within the described bore of screw 107, but said shank has a reduced screw-threaded end 110 which engages with a screw-threaded bore in the upper end of the before named rod 12, while the head 111 of screw 109 next its shank is of such diameter as to leave space for a surrounding series of balls 112, forming a ball bearing between this portion of the head 111 and the annular wall of the hollow open head 108 of screw 107, and above the same the said head 111 of screw 109 is enlarged in diameter so as to rest upon and cover the balls of said ball bearing and close the hollow open head 108 of screw 107, all as clearly shown in Fig. 8. The object of this construction is to enable the operator, by turning the screw 107, to slightly vary the elevation of the rod 12, and thus of the segment 17 to which the upper edge of the paper 20 is clamped, so as to insure writing upon a ruled line or precise particular point upon said sheet of paper.

I will next describe the construction of the shift keys and connections, premising this explanation with the statement that in my complete machine there may be twenty-eight keys to print eighty-four characters arranged as in the standard keyboard of double-shift machines although, if desired, a less number of keys may be employed. This is immaterial, and in the present drawings, I have, for the sake of clearness, shown only a few type keys, but this being a double shift machine, both the shift-keys and accessory parts are fully illustrated. I will first refer to the "single shift", used chiefly for the capital letters. As best shown in Fig. 6, the arm 46 which projects from the lower parts of tube 44 through slot 45 in standard 8, is pivotally connected, by link 113, to one end of lever 114, which latter is shown pivoted, at 115, to a lug 116 on the base-plate 3, and the other end of the lever 114 is perforated for the reception of the connecting rods 117, 118, for the "single shift" and "double shift" respectively, the connecting rod 117 being pivotally connected by pivot bolt 119 to one end of the single shift key lever 120, having single shift key 125 at its other end.

121, 122, designate two parallel horizontal members of the main frame of the machine and 123 is a vertical plate secured to said main frame, and a journal 126 extends from this plate 123 to a lug 124, depending from the frame member 122. The single-shift key lever 120 is fast on this journal 126. By depressing key 125, the lever 120 will raise connecting rod 117 attached to its other end, and also raise the adjacent end of the lever 114 (by reason of the enlarged foot 127 of connecting rod 117, which is below the perforation in said lever 114) this depressing the opposite end of said lever 114, and thus pulling down on link 113, and thereby drawing down arm 46 (and tube 44 connected therewith) until the said arm 46 strikes the horizontal stop arm 128, which projects laterally from the upturned end 129 of a lever 130, said lever being journaled in lugs 131, 132, rising from the base-plate 3, on a line outside of that of the lever 114. This action, in drawing down the tube 44, thereby depresses the platen-wheel 52 carried by arm 50 secured to said tube 44, to bring said wheel 52 into the "single shift" position to receive the impact of the middle character on the type-block, as hereinafter described, it being understood that in "double shift" machines each type-block carries three characters one above the other.

The "double shift" mechanism will next be described. The lever 130 just referred to has, on the opposite end from the stop arm 128, an upturned end 133, terminating in a curved projecting arm 134 which extends over a block 135 fast on connecting rod 118. This rod, like rod 117, extends through a perforation in the adjacent end of lever 114 below which said rod is provided with an enlarged foot 136. The connecting rod 118 is pivotally connected by pivot bolt 137 to one end of the double-shift key lever 138, which carries double-shift key 150 at its other end. This lever 138 is shown mounted on a collar 139 which is loose on the before named journal 126. By depressing the said double-shift key 150 fast to one end of said lever 138, the other end of this lever is raised and with it, the connecting rod 118 and adjacent end of lever 114, and the block 135 on said connecting rod 118 raises the curved arm 134 on the end of lever 130, thereby rocking said lever, and consequently rocking the end 129 and lateral stop-arm 128 of said lever 130 back out of the way of arm 46, on the tube 44, and as the attached end of lever 114 is raised by the connecting rod 118, the other end of said lever 114 pulls down, through link 113, on said arm 46, and as the stop-arm 128 is now out of the way, the said arm 46 is pulled down the whole distance of the slot 45, and the platen-wheel 52 carried by said tube 44, as above described, is brought down in "double-shift" position to receive the impact of the lowest of the three characters on the type-block.

140 designates a lever designed for rotating the slotted tube 4, which, by means of arm 13, rotates the rod 12 which carries the segment 17 to which the sheet of paper 20 is clamped. The toothed segment 16 hereinbefore named, is fast on the tube 4, as stated, and just below this is another and smaller toothed segment 141, also fast on tube 4. This latter segment 141 meshes with a toothed segment 142 (also below segment 16) on one end of an arm 143, whose other end is fast to a sleeve 144, to which the lever 140 is attached, the inner end of said lever being forked, and the tines 145, 145, of said forked end straddling the said sleeve, bearing against lugs 146, 146, on said sleeve 144 and there secured by pivot screws 147, 147, there being a stop-arm 148 projecting forwardly from the top of said sleeve to limit the upward movement of the forked end of said lever 140. A vertical rod 149 extends through said sleeve 144, and is made fast thereto. The upper end of this rod 149 is received in a lug 151 projecting forwardly from the front face of the outer part 10 of the hereinbefore described curved paper holder and guide, while the lower end of rod 149 is stepped in the barrel 152 of the main spring 153 which moves the segment 16, and tube 4 as hereinafter described. Projecting from said sleeve 144 is a two armed plate 154 on which there rests the lower end of a coiled spring 155, whose upper end is received in a recess in the underside of the lever 140, and which spring holds this end of the said lever up against the described stop-arm 148.

The teeth of the segment 16 are for the engagement therewith of the letter-space dogs, 156 being the fixed and 157 the movable dog pivoted to the shank of said fixed dog by pivot-screw 158. The fixed dog 156 is fast to a rock-shaft 159, which rocks on the pointed ends of screws 160, 160, projecting from hangers 161, 161, which are fast on another rock-shaft 162, which is journaled in the uprights 163, 163, of the main frame.

164 is a lug on the rock-shaft 159 and from this lug a spiral spring 165 extends to a point on the base-plate 3, and is there made fast. The function of this spring 165 is to keep the points of the dogs 156, 157, at their lowest positions, with the point of movable dog 157 in mesh with the teeth of segment 16, which is done by holding the shaft 159 in its rocked over position.

Fast on shaft 159 are the backward projecting levers 166, whose free ends rest on pins 168 projecting laterally from levers 167, which are pivoted at 169 to lugs 170 on the base-plate 3. These levers 167 have pivoted thereto, as shown at 171, the lower ends of lift rods 172, which are provided with series of laterally projecting pins 173, 173, and whose upper ends have sliding movement in lugs 174 on the main frame.

175 designates the space bar, extending as usual across the front of the machine, and secured at each end to a space bar lever 176 which levers extend through the vertical slots in the front and rear combs 177, 178, as usual. These space bar levers are connected by rods 179, pivoted thereto, to arms 180 which project from the shafts 181, journaled in the upper part of the frame uprights 163, and central front casting 182 of the main frame, said connecting rods being also pivoted to said arms 180. These short shafts 181 each carry a backward extending pin 183 which passes under the top pin 173 of each lift rod 172, and hence by the depression of the space bar 175 (whose levers 176 are held to place at their inner ends within the slots of the back comb 178, by springs 184) the connecting rods 179 will pull down the outer ends of the arms 180 on shafts 181 and the pins 183 will raise the contacting pins 173 and with them the lift rods 172 which will raise the levers 167 and with the pins 168 and thereby the levers 166, which will rock the shaft 159 which carries the dogs 156, 157, and permits one tooth of the segment 16 held by said dogs against the force of the main spring 153, to escape.

Rising from the base-plate 3 are bearings 185, 185, for the transverse shaft 186 to which are rigidly secured the side bars 187, 187, forming, with the front transverse vertically arranged plate 188, a bail, which is just beneath the lever 140. These side bars 187 have rearward extensions 189 projecting under forward arms 190 fast on the shaft 162. The bail is kept normally elevated by coiled spring 191 extending from the rear extension 189 of one of the bail side bars to a pin 192 on the base-plate 3, and the rear extensions 189 have limited play between lateral pins 193 and 194 on the said bearings 185, 185. When the lever 140 is depressed, it depresses the said bail 187, 188, and raises the arms 190 on shaft 162 and thus rocks said shaft and this brings the hangers 161 forward, carrying with them the shaft 159 which withdraws the points of the dogs 156, 157 from the teeth of the segment 16, thus allowing the slotted tube 4 with all its attachments to be rotated freely back and forth by the lever 140. The sheet of paper 20 may thus be carried to the left to begin a new line by means of this lever 140, or if preferred, by the depression of the key 200 which with its attachments will be next described. With the lever 140, the paper carriage 17 may be moved back and forth, by hand, to any point desired, and the paper kept on the same line, but with the key 200, the said holder is always moved to the extreme right with its left edge opposite the beginning of the line, by the simple depression of the said key 200 and simultaneously therewith the rod 54 is elevated one or two teeth (according to adjustment) whereby the paper carriage carries the sheet of paper 20 upward to present the beginning of a new line to be written upon in the following manner. The key 200 is fast to the obliquely raised outer end of a lever 195 whose inner end is fast to one end of a shaft 196 and whose inner end is supported in a bearing 197 projecting from the back comb 178, and 198 designates an arm rigidly secured to and projecting downward from said shaft 196. The lever 195 carries, adjacent to its inner end, an inward projecting lateral pin 199, and the shaft 101 has rigidly secured thereto, and projecting upward therefrom an arm 201, under and in the path of said pin 199. 202 is a finger projecting laterally from the sleeve 144, and when the said oblique key 200 is depressed, the arm 198 moves the finger 202 backward, and rotates the sleeve 144 to which the said finger is rigidly attached and thus moves the arm 143 also rigid with said sleeve so that the toothed segment 142 on said arm will engage the toothed segment 141, to which tube 4 is made fast, and thus move said tube, and carry it and its contained rod 54 around, the said rod moving the paper carriage 17 around to the extreme right so that the left edge of the paper carried thereby will be brought to the printing point in front of the platen wheel 52. While this is being done, the pin 199 on the lever 198 is depressing the arm 201, and thus inwardly rocking the rock shaft 101, and hence depressing lever 98, and then the connected parts raise the line-spacing rod 54 exactly as when the line-space key 100 is depressed, as already described.

It often happens that in type-writing one or two letters require to be changed, and hence back-spacing must be provided for. For this purpose, a pawl 203 for engagement with the teeth of segment 16, is employed, which is pivoted on the back-space slide 204, and normally held out of engagement with said teeth, by one wall of the cut out lower portion of the part 10 of the paper holder, as shown in Fig. 4, there being a spring 205 on said slide bearing against said pawl. This slide 204 is held in this position by a coiled spring 206 extending from one end of said slide to a lug 207 on the base-plate 3, and the contact of a pin 208 against a slide bearing 209 on said base. The other end of this slide 204 moves in a like bearing 210 on the base-plate. At this other end the slide carries another pin 211 for engagement with the arm 212 of a bell-crank pivoted at 213 to a lug on the said base-plate, and the other arm 214 of this bell-crank extends into the path of a downward arm 215 forming the inner end of lever 216, of the back-spacing key 225 which lever is pivoted as shown at 217, to plate 218 secured to adjacent upright 163. Lever 216 is held up by spring 219, from plate 218, in similar manner to the support of the adjacent levers 74 and 103, by springs 220, and 221 from the same plate 218. When the back-spacing key 225 is depressed the arm 215 of its key-lever 216 rocks the bell-crank lever, by pushing against its arm 214 so that the other bell-crank arm 212 engages the pin 211 of the slide 204 and draws it toward the right hand end of the machine, which causes the pawl 203 to engage with the adjacent tooth of the segment 16, and draw said segment back one tooth, for each depression of the key 225, until the desired point to be printed upon is reached. Each time the key 225 is released, the spring 206 draws the slide 204 to its former or normal position.

In connection with the lever 140 which actuates the paper carriage, a series of column stops are provided which will now be described. The front transverse vertically arranged plate 188 of the bail beneath the lever 140, has grouped, at each end thereof, series of key levers of different lengths, pivoted upon common fulcrum points, the inner ends of these levers terminating in upward projections, forming stops, all as best shown in Figs. 4 and 11, where 222, 222, designate the said fulcrum points, 223, 223, the said key levers, 224, 224, the said upward projections at the inner end of said key levers, 226, 226, the keys thereof, 227, 227, the upper stop pins, and 228, 228, the lower stop-pins on the plate 188 to limit the movement of the said key-levers, and 229, 229, the springs which keep said key levers normally up against the upper stop-pins 227, 227. The said plate 188 is further provided on each side with upward projecting pins 230, 230, which serve to limit the travel of the lever 140. These column stop keys 226, 226, are arranged so that by pressing down on any one of these keys the projection 224 of its lever 223 will thereby be raised up in the path of the lever 140, whose travel is thereby limited to whatever stop 224 is thus elevated, the paper carriage being carried to the corresponding point, by means of a further depression of said key with the key-lever 223 resting on the lower stop-pin 228, which will depress the plate 188, and the whole bail of which it forms a part, this serving to withdraw the dogs 156, 157, from the teeth of the segment 16 (just as when the said bail was depressed by the lever 140, as already described) and this will permit the said lever 140 to be moved by the unwinding of the spring 152, until the lever encounters the described upturned end 224 of the key-lever 223. The spring 153, heretofore named, is secured, one end to the rod 149 below and fast to the sleeve 144 to which the lever 140 is attached, and the other end of its spring to its barrel 152 and hence each time the lever 140 is moved to the left, this spring is wound up and under tension, so that when the dogs 156, 157, are withdrawn from the segment 16, this spring 153 automatically unwinds. The various column stop keys 226, are preferably marked with numbers corresponding to the number of the type-spaces which their projections 224 permits to be utilized before the paper carriage 17 is stopped, and the line on the sheet of paper 20 finished, these spaces being divided up as desired; for example, the key whose projection stops the paper carriage after ten spaces are traversed would be marked "10" and the next key for permitting ten more spaces to be used, would be marked "20," and so on. These column stop keys are used chiefly in tabulating, and the number of such keys and the distance between keys can be as desired.

To enable the operator to at all times determine, at a glance, the particular point being printed upon, on any line, an indicator is provided, as follows. The vertical rod 149 which is fast to, and rises from the sleeve 144, and whose upper end passes through lug 151, carries fast thereon, above said lug, a semi-circular internal gear 231, which is in mesh with a mutilated pinion 232 fast on a vertical arbor 233, herein shown journaled in said lug 151 and lug 234 above, and having a collar 235 above said lug 151, while just above said pinion 232 the arbor has fast thereon the hub 236 of a pointer arm 237, whose pointed free end projects through a transverse slot 238 on the curved front central casting 182 of the main frame of the machine.

239 designates a coiled spring surrounding the arbor 233 between lug 234 and the pointer hub 236, the ends of this spring being connected to said parts so that the tension of this spring will be increased as the pointer is moved from right to left, and this takes up any lost motion between the teeth of the gear 231 and its pinion 232, to insure accuracy at the outer end of the pointer 237 where it moves over a scale 240, just below slot 238, and this said pointer indicates the particular type-space opposite the printing point on the sheet of paper 20, at any time.

241 designates a bell which is carried upon a movable slide 242 which has movement in a path parallel with the scale 240 in a transverse slot 243 formed in the curved front central casting 182 below the slot 238 above referred to. A set-screw 244 is provided for holding the said slide at any desired point in said slot, said set-screw enabling the slide to be clamped at any desired point relatively to the scale 240. A bell-hammer 246 is pivoted to said slide by means of a stud 245 on said slide. The bell-hammer 246 has attached to it a trip-arm 247 which projects into the pathway of the pointer 237 and is so constructed as to raise the bell-hammer 246 when engaged by the said pointer 237; the hammer being dropped against the bell when the pointer 237 passes beyond the end of the trip-arm 247. At the return sweep of the pointer 237 the arm 247 is tripped without raising the hammer 246. By this device an alarm may be sounded the required number of spaces before the paper holder reaches the limit of its movement or at the end of its letter-space movement depending on the point where the slide is set.

The printing point is the center of the platen-wheel 52, and to enable the type to reach this point, when one of the type-keys 250 is depressed, as hereinafter described, the upper portion of the paper holder is cut away at this point, as shown at 248, the ribbon 249 passing in front of the latter and over guide-pins 251, 251, projecting from said paper holder on each side of said cutaway portion, and then back of the rear ends of the arc-shaped upper rim 252 of the typebasket frame, and then around the ribbon spools 253, 254. These spools are fast to the upper ends of vertical shafts 255, 256, which have their upper bearings in ears 257, 257, projecting from said rim 252, and their lower bearings in lugs 258 on the base-plate 3. Each shaft 255, 256, carries a ratchet-wheel 259 fast thereon, and is loosely connected by a link 260, to connecting rods 261, whose other ends are pivotally connected to the arms of the two-armed plate 154. Mounted upon the same pivots which connect the links and connecting rods are pawls 262, 263, pawl 262 being a pull-pawl and 263 a pushpawl. The pivoted end of each pawl is formed with a hub, having a notch or recess in its periphery, for the reception of the free end of a spring 264, secured to the adjacent link 260, and the rods 261 also carry springs 265 whose free ends bear against the said pawls 262, 263, beyond their pivoted points. The functions of the springs 264 is to hold the pawls out of engagement with the ratchetwheels 259, one of said pawls being always out of, and the other pawl always in such engagement, and the springs 265 are only operative when the pawls 262 or 263 are in engagement with said ratchet wheels. It will therefore be understood that when the ribbon is unwound from either spool, the operator will pull the adjacent pawl away from the ratchet-wheel of such spool, and throw the other pawl into engagement with its ratchet wheel.

The vertical rod 149, which constitutes the motor shaft of the machine, has secured to its lower end, one end of the power spring 153, whose other end is fast to the spring barrel 152, as best shown in Fig. 14, and the said spring barrel is held in a recess in the base-plate 3 by clips 266, 266, and the bottom plate of said barrel is formed with annular exterior ratchet teeth 267, for engagement with a dog 268 pivotally connected to the underside of base-plate 3 and held into such engagement by a spring 269. The motor shaft 149 is stepped in the center of said lower plate of the spring barrel, and, below this point, the said plate is provided with a depending squared wrench-head 270, all as best shown in Fig. 15, whereby the spring can be independently wound up to increase its tension. Hence, with each rotation of the shaft 149, it will be seen that the ribbon 249 is fed, through the above described connections.

The arc-shaped upper rim 252 of the type basket frame is struck on a radius from the described printing point of the platen wheel 52, as are also the two spiral stepped side strips 271, 271, which start from the rear ends of said rim 252, and whose interrupted lower ends are joined to the uprights 163, 163, of the main frame. Between the said rim 252, and each step of the strips 271 are the pivot posts 272 of the type bars 273, whose free ends 274 constitute the type-blocks each having three vertically arranged printing characters, as already stated. 275, 275 designate the upper pivot pins of said pivot posts and these pins are each formed with an eccentric cone point 277 on the lower end and a kerf for a screw driver on the upper end. These pins pass through smooth bores in the rim 252 and are held in position to which they have been adjusted by set-screws 279 and when the latter are loosened the pins 275 can be slightly turned, so that the cone points 277 which rest in seats in the exact center of the tops of the pivot-posts 272 will move the upper ends of said posts at a slight angle from the vertical, so that the type bars 273, which are rigidly connected to said posts 272, can be adjusted to cause the printing characters on their type blocks 274 to strike against the precise printing point on the platen wheel 52. To permit a necessary vertical adjustment of said pivot posts their lower ends are also formed with central seats to receive the concentric cone points 278 of adjusting screws 276 which pass through the steps of the side strips 271, these screws being kept in adjusted position by setscrews 280 and having kerfs in their heads to receive a screw driver for such adjustment, all as best shown in Fig. 13. These pivot-posts 272 are of successively increased lengths as the distance increases between the rim 252 and each successive step of the side strips 271, but otherwise exactly alike, and each has a perforated ear 281 projecting laterally from its lower portion, through which there passes the upper end of a torsion spring 282 rising from a lug 283 on the side strip 271, this spring being to return the type-bar 273 to a position of rest, after printing. Upon the opposite side of each pivot post 272 is an arm 284 to which is connected a rod 285, whose other end is pivotally connected to one arm 286 of a bell-crank having an elongated center-post 287 and another arm 288. These center-posts 287 are of different lengths, and project beyond the said arms 286, 288, of said bell-cranks, said arms being on different vertical planes on the different bell-cranks as shown. The said center-posts 287 are pivoted between the uprights 163 and lugs 289 on the inwardly inclined Y-shaped continuation 290 of the central front casting 182 of the main frame, the stem 291 of this part 290 extending down to the horizontal frame member 121, and there being additional center-posts 287 between this stem 291 and the uprights 163. These center-posts 287 of the said bell-cranks are also provided with rearward extending pins 292 for engagement with the pins 173 of the hereinbefore named lift-rods 172 of the spacing mechanism.

To each bell-crank arm 288 there is pivotally connected the upper end of a rod 293 whose lower end is similarly connected to the corresponding type-key lever 294 (having its type-key 250 on its outer end) the rear end of each key-lever 294 being fulcrumed in the back comb 178, and held to place by spring 295. As one of the type-keys 250 is depressed, its lever 294 will pull down its rod 293 connected with arm 288 of the described bell-crank lever and rock the center-post 287 thus pulling over the other arm 286 which through its described connections causes the pivot-post 272 to partially rotate. This causes the type-bar 273 which is rigid on said pivot-post to swing around so as to bring its type-block 274 opposite the described printing point and give an impact of one of the printing characters thereon on the ribbon and paper against the platen-wheel 52, as best indicated in Figs. 5 and 12. This described movement, at the same time through the pin 292 will raise the lift-rod 172 and thereby operate the letter-spacing mechanism previously described. When the operator's finger is lifted from the type-key 250 just struck the torsion spring 282 will restore the type-bar 273 to its normal position, the spring 295 simultaneously lifting the lever 294 of said key 250 to its original place. All of the type-bars 273 are of the same length and the pivot-posts to which they are connected are at equal distances apart, so that all the type-bars will nest against the arc-shaped upper rim 252 of the type-basket frame, on the same horizontal plane.

The hereinbefore named release key lever 74 is fast to a rock shaft 73 as already stated, and the other end of this rock-shaft is supported in a lug 296 depending from the horizontal member 122 of the main frame. The described spiral stepped side strips 271 have broad inner faces, as shown in Fig. 2, but on the outer side are formed with the zig-zag series of steps as indicated by the dotted line 297, in same figure, so that the screws 276 can be inserted through vertical bores through these steps, as best shown in Fig. 13, and the lower ends of these strips 271 are joined to the uprights 163, by lateral extensions 298, 299, as indicated in Fig. 3. The different keys of the machine and their actions have been described, key 100 being the lower space key, the key 200 being the combined line-space and return key, while the key 300 at the outer end of lever 140, would be properly termed the return key, as it is used to simply restore the paper carriage to position with the sheet of paper at the beginning of a line, without raising said sheet.

It will be understood that the line-spacing rod 54 fits so closely within the tube 44, that when it is released by the release key 75 it falls against an air-cushion, as the hollow standard 8 is closed at the bottom, and hence it descends without jar, which is a great advantage.

Having thus described my invention, what I claim as new, and desire to secure by Letters-Patent, is:—

1. In a typewriting machine, a vertically arranged motor-shaft, a spring applied to turn said shaft, an upright revoluble tube, a vertically sliding rod mounted within and turning with said tube, a sector-shaped paper-holder attached to the upper end of said rod, a toothed segment secured to the lower end of said revoluble tube, a toothed segment secured to the motor-shaft and intermeshing with that on said tube, and a letter spacing escapement device for controlling the rotary movement of said tube, rod and paper-holder under the action of said spring.

2. In a type-writing machine, the combination with the base-plate of a hollow standard rising therefrom and slotted in its upper portion, a vertically movable tube within and projecting above said standard, and slotted in its upper portion; a spring within said standard for keeping said tube normally elevated; a vertically movable line spacing rod, formed with continuous external rack-teeth, within said tube; a detent pawl on said tube for engagement with said rack teeth; a lever-actuated rod supported parallel to said standard; a push pawl on said rod for engagement with said rack-teeth, both the detent pawl and push pawl extending through the slots in the upper portion of the tube and standard; a vertically movable rod supported adjacent to the said standard; a paper-carriage secured to and extending from said rod; and a clamp extending from the upper end of the line-spacing rod, and connected to the paper-carriage supporting rod for varying the elevation of the latter, uniformly with that of said line spacing-rod.

3. In a type-writing machine, the combination with a plate and clamps thereon, forming a paper-carriage, of a vertically movable rod to the upper end of which said plate is secured, and which rod has a screw-threaded bore in its upper end; a large screw having an enlarged hollow open head, and a communicating smooth central longitudinal bore; another screw, having a smooth shank fitting in the bore of the first named screw and terminating in a reduced screw-threaded end which engages within the screw-threaded bore in the upper end of the vertically movable rod, the head of the smooth shank being located within the hollow head of the large screw against a ball-bearing therein; a vertically movable line spacing rod supported adjacent to the paper-carriage supporting rod just named, and a clamp rigidly united to the upper end of the said line-spacing rod, and having a screw-threaded bore for engagement with the before named large screw at the upper end of the other rod.

4. In a typewriting machine, the combination with a curved horizontal scale, of a vertical revolving shaft in geared connection with the paper carrying mechanism of the machine; a vertical revolving arbor in geared connection with the said shaft, a spring applied to take up lost motion in the gearing between the said shaft and the said arbor; a pointer fast upon said arbor and extending over the said curved scale, a bell, a slide carrying said bell, said slide being movable in a path parallel with said scale, means for securing the said slide in any desired position relative to the scale, a hammer pivotally supported on the said slide, and a trip-arm connected with the said hammer and projecting into the path of the said pointer.

5. In a typewriting machine, the combination of a platen, a sector-shaped paper-holder having swinging letter space movement about a vertical axis and vertical line-space movement, a longitudinally slotted upright revoluble tube, a vertically movable rod sliding within and turning with said tube and carrying said paper-holder at its upper end, an arm secured to the lower end of said rod and projecting horizontally through a slot in said tube, a toothed segment secured to the lower end of said tube, an arm rigidly attached to and projecting horizontally from the upper end of said tube, and a vertical rod extending between and rigidly attached at its ends to said arm and toothed segment, said rod having sliding engagement with the horizontal arm which projects from the lower end of the vertical rod within the sliding tube.

6. In a typewriting machine, the combination with a platen, of a sector-shaped paper holder having swinging letter space movement on a vertical axis and vertical line-space movement, a vertically sliding line-space rod connected at its upper end with said paper-holder and provided with ratchet teeth, a spring-pressed detent pawl normally engaged with the ratchet teeth on said rod, a vertical, rotative rod provided with an arm adapted to act on said detent pawl when the rod is turned in a manner to disengage said detent pawl from the ratchet teeth, a rigid horizontal arm on the lower end of said vertical rod, and a key-lever having operative connection with the said horizontal arm.

7. In a typewriting machine, the combination of a platen, a sector-shaped paper-holder having swinging letter space movement on a vertical axis and vertical line-space movement, a vertically movable line-space rod connected at its upper end with said paper-holder and provided with a series of ratchet teeth, a vertically movable operating rod provided with a push pawl adapted to operate on said ratchet teeth to lift the line-space rod, a spring pressed detent pawl adapted to normally engage said ratchet teeth, an upright rotative rod provided with a laterally extending arm adapted to act upon said detent pawl to disengage the same from the ratchet teeth of the line-space rod, and a key-lever having operative connection with said vertically movable operating rod and also with the said vertical, rotative rod whereby both the push pawl and the detent pawl may be simultaneously disengaged from the line-space rod.

8. In a typewriting machine, the combination of a platen, a sector-shaped paper-holder having swinging letter space movement on a vertical axis and a vertical line-space movement, an upright hollow standard provided with a slot in its upper portion, a vertically movable tube adapted to slide within and projecting above said hollow standard, the upper part of said tube being slotted to correspond with the slot in the upper part of said standard, a platen-supporting arm on the upper end of said tube, means connected with said tube for giving shift-movement to the platen, a line-spacing rod sliding in said tube and connected at its upper end with the said paper-holder, said line-spacing rod being provided with a series of ratchet teeth, a spring-pressed detent pawl pivoted to said tube and engaging said ratchet teeth, said detent pawl being provided with an arm which extends outwardly through the slot in the standard, a vertical, rotative rod mounted parallel with the standard and provided with an arm adapted to act upon the detent pawl when said rod is turned, a vertical, endwise movable operating rod mounted adjacent to said standard provided at its upper end with a push-pawl adapted to engage said ratchet teeth on the line-space rod, key-actuated means for giving vertical movement to said operating rod, and key-actuated means for turning said vertical rod to release the detent pawl from the said line-space rod.

9. In a typewriting machine, the combination of a platen, a sector-shaped paper-holder, an upright revoluble tube, a vertically movable rod sliding within and turning with said tube, and to the upper end of which said sector-shaped paper-holder is secured, a hollow standard located parallel with said revoluble tube, a vertically movable tube adapted to slide within and projecting above said hollow standard, an arm on the upper end of said vertically movable tube carrying the said platen, a spring within said standard for keeping said tube normally elevated, a vertically-movable line-spacing rod sliding in said tube and connected at its upper end with said paper-holder, said line-spacing rod being provided with ratchet teeth, a spring-pressed detent pawl adapted to normally engage the said ratchet teeth, a vertically movable push-pawl acting on said ratchet teeth to lift the line-spacing rod, and key-actuated means for operating said push pawl.

10. In a type-writing machine, the combination with the paper carriage, and return key and its lever and connected mechanism, for moving said carriage to always present the left edge of the sheet of paper carried thereby to the printing point whenever said key is operated, of a vertically arranged plate beneath said return key lever having at each end thereof, a stop for said lever, and series of key levers of different lengths pivoted upon common fulcrum posts, the inner ends of these levers terminating in upward projections; stop pins above and below each lever adjacent to its outer end, and springs for keeping said key levers normally up against the upper stop-pins, said groups of key levers forming column stops, arranged at predetermined distances apart.

11. In a type-writing machine, the combination with a back-spacing key and its lever, of a bell-crank lever pivoted to a lug on the base plate of the machine; an arm depending from said key-lever in engagement with one arm of the said bell-crank lever; a horizontal slide having its bearings in lugs on said base-plate; a toothed segment; a paper-carriage supported from and movable with said segment; a spring-controlled pawl on said slide in engagement with the teeth of said segment; pins on said slide, one of them being in engagement with the other arm of said bell-crank lever, and the other pin for engagement with the adjacent bearing-lug of the said slide, and a coiled spring extending from the end of said slide to a fixed point on the said base-plate.

12. In a typewriting machine, the combination of a platen, a vertically movable horizontally swinging, sector-shaped paper-holder, a slotted hollow standard, a vertically movable tube within the standard, a line-spacing rod within said tube, the upper end of which is connected with and gives vertical movement to said paper-holder, said spacing rod being provided with ratchet teeth, a vertical, endwise movable operating rod mounted adjacent to said standard, a spring-controlled push pawl on said rod adapted to engage the ratchet teeth on the line-spacing rod, a spring acting on said operating rod to normally depress the same, and a key-lever connected with and giving movement to said operating rod.

13. In a type-writing machine, the combination of a platen, a sector-shaped paper-holder having swinging letter space movement on a vertical axis and vertical line-space movement, a vertically movable line-spacing rod, the upper end of which is connected with and gives vertical movement to said paper-holder, and which is provided with ratchet teeth, a vertical, endwise sliding operating rod provided with a push-pawl adapted to act upon the ratchet teeth on said line-spacing rod, and means for actuating said vertically movable rod embracing a lever pivoted between its ends to swing in a vertical plane, a second horizontally arranged lever pivotally supported at one end and provided between its ends with a depending arm, the lower end of which is engaged with the first named lever, a transverse horizontal rock-shaft provided with a rigid horizontal arm, the free end of which acts downwardly on said second lever, said arm being provided with a laterally projecting pin, and a line-spacing key-lever adapted to act upon the laterally projecting pin.

14. In a type-writing machine, the combination with the base-plate of a hollow standard rising therefrom, a vertically movable tube within said standard and a line-spacing rod vertically movable within said tube, of mechanism for elevating said line-spacing rod, and means for releasing same, and permitting the said rod to descend by gravity, the said hollow standard being closed at the bottom to provide an air-cushion, whereby the said rod will descend slowly and without jar, on its release.

15. In a typewriting machine, the combination of a platen, a sector-shaped paper-holder having swinging letter-space movement on a vertical axis and vertical line-space movement, an upright rotative tube, a rod which is vertically movable within said tube and turns therewith, said rod carrying the paper-holder at its upper end, a spring applied to act on said tube to turn the paper-holder in the direction of its letter space feed, a horizontally swinging key-lever connected with the said tube for returning the paper-holder to its starting point against the action of said spring, a ratchet segment secured to the lower end of said tube, a horizontal rock-shaft carrying letter-spacing dogs for engagement with the ratchet segment, a transverse rock-shaft located above the dog-carrying rock-shaft and provided with depending arms affording bearings for the said dog-carrying rock-shaft, and provided also with a forwardly projecting rigid arm, a vertically movable bail at the front of the machine having a rearward extension projecting under said forwardly projecting arm on the said upper rock-shaft, and a spring applied to keep said bail normally elevated; said return key-lever extending over said bail and acting upon the same when depressed to withdraw said dogs from the said ratchet segment, thereby permitting the tube and paper-holder to be swung freely by the action of said key-lever.

16. In a typewriting machine, the combination of a platen, a sector-shaped paper-holder having swinging letter-space movement on a vertical axis and vertical line-space movement, a spring applied to turn said paper-holder in the direction of the letter-space feed, a pawl-and-ratchet mechanism for giving line-space movement to said paper-holder, and means for returning the paper-holder to its starting point against the action of said spring and at the same time effecting line-space movement of said paper-holder, comprising a rock-shaft extending transversely of the machine, said rock-shaft being provided with a rigidly attached key-lever and with a rigid, depending arm, a horizontally oscillating arm connected with and adapted to give turning movement to the paper-holder and which is located in the path of said depending arm on said rock-shaft, a second, horizontal transversely arranged rock-shaft provided with a rigid arm, a pin carried by the first named rock-shaft and adapted to act upon the arm of said second rock-shaft to turn the same when the key-lever is actuated, and operative connections between said second rock-shaft and said pawl-and-ratchet mechanism adapted to give line-space movement to said paper-holder when said key-lever is operated.

17. In a typewriting machine, the combination of a platen, a sector-shaped paper-holder having swinging letter-space movement on a vertical axis and vertical line-space movement, an upright rotative tube provided at its lower end with a gear-segment, a rod sliding vertically in said tube and turning therewith and carrying at its upper end the said paper-holder, a spring acting on said tube to turn the same in a direction to give letter-space movement to said paper-holder, an escapement mechanism for giving letter-space movement to said paper-holder under the action of said spring, an upright rock-shaft provided with a gear-segment intermeshing with the gear-segment on the lower end of said tube, a horizontally swinging arm on said rock-shaft, a horizontal transverse rock-shaft provided with a depending arm adapted to engage the arm on said vertical rock-shaft and provided also with a key-lever, a second horizontal, transverse rock-shaft provided with a rigid arm, a pin carried by the first named rock-shaft and acting on the arm of said second rock-shaft to turn the same when the key-lever is depressed, a pawl-and-ratchet mechanism for giving line-space movement to the paper holder, and a connection between said second rock-shaft and said pawl-and-ratchet mechanism.

18. In a typewriting machine, the combination of a platen, a sector-shaped paper-holder having swinging letter-space movement on a vertical axis and vertical line-space movement, a spring applied to turn said paper-holder in the direction of letter-space feed, an escapement mechanism for giving letter-space movement to said paper-holder, a vertically movable line-space rod connected with said paper-holder and provided with ratchet teeth, a vertical, endwise movable operating rod provided with a push-pawl adapted to engage the ratchet teeth on said line space rod, a key-lever adapted to act upon the paper-holder to give backward movement to the same against the action of said spring, a horizontal, transverse rock-shaft adapted to be turned or actuated by the depression of said key-lever, and a connection between said rock-shaft and the said operating rod, embracing a horizontally extending, rigid arm on said rock-shaft, a horizontally arranged pivoted lever against which said arm acts downwardly, when the said key-lever is depressed, said lever being provided with a depending arm, and a second horizontally arranged lever pivoted between its ends, engaged at one end with said depending arm and at its opposite end with said operating rod.

19. In a typewriting machine, the combination of a platen, a sector-shaped paper-holder having swinging letter-space movement on a vertical axis and vertical line-space movement, a spring applied to turn said paper-holder in a direction to give letter-space feed, an escapement mechanism for giving letter-space movement to said paper-holder, a vertically movable line-space rod, connected with said paper-holder and provided with ratchet teeth, a vertically movable actuating rod provided with a push-pawl adapted to engage the teeth on said line-space rod, a key-lever adapted to act upon the paper-holder to return the same against the action of said spring, a horizontal, transverse rock-shaft adapted to be turned or actuated by the depression of said key-lever, and a connection between said rock-shaft and the said vertically movable operating rod embracing a horizontally extending, rigid arm on said rock-shaft, a horizontally arranged pivoted lever provided with a depending arm, a crank pivoted to said lever and provided with a pin which rests upon the same and extends beneath the rigid arm of the said rock-shaft, and a second horizontally arranged lever, pivoted between its ends and engaged at one end with said depending arm and at its opposite end with said operating rod.

20. In a typewriting machine, the combination of a platen, a sector-shaped paper-holder having swinging letter-space movement on a vertical axis and vertical line-space movement, a spring applied to turn said paper-holder in a direction of the letter-space feed, a ratchet segment which is connected and turns with said paper-holder, a horizontal rock-shaft provided with escapement dogs acting on said ratchet segment, a spacing key-lever, a vertical lift rod provided with a laterally extending pin, a horizontal rock-shaft at the upper part of the machine provided with oppositely extending horizontal arms, one of which extends beneath the pin on said lift rod, a vertical connecting-rod connecting one of the other arms on said rock-shaft with the space-key lever, and a horizontal, pivoted lever to which the lower end of said lift-rod is connected and which is provided with a laterally extending pin, said rock-shaft which carries the feed-dogs being provided with a rigid arm which extends over said laterally extending pin.

21. In a typewriting machine, the combination of a platen, a sector-shaped paper-holder having swinging letter-space movement on a vertical axis and vertical line-space movement, a spring applied to turn said paper-holder in the direction of the letter-space feed, a ratchet segment connected and turning with the paper-holder, a horizontal rock-shaft provided with feed-dogs which engage said ratchet segment, a horizontal rock-shaft arranged above and parallel with the feed-dog carrying rock-shaft and provided with depending arms in which said feed-dog carrying rock-shaft has bearings, a horizontally swinging and vertically movable lever having operative connection with the paper-holder, by which said paper-holder is swung laterally when the lever is moved horizontally, a vertically movable bail extending beneath said laterally swinging lever, a spring applied to hold said bail normally in its elevated position, and a connection between said bail and said upper rock-shaft, whereby the latter will be rocked and the feed-dog carrying rock-shaft be moved to disconnect the feed-dogs from the ratchet segment when the said bail is depressed by downward pressure on said lever.

22. In a typewriting machine, the combination of a platen, a sector-shaped paper-holder having swinging letter-space movement on a vertical axis and vertical line-space movement, a pawl-and-ratchet mechanism for giving line-space movement to said paper-holder, and means for actuating said pawl-and-ratchet mechanism embracing a key-lever, and connections between said key-lever and the pawl-and-ratchet mechanism embracing a horizontal, vibrating arm operated by the key-lever, a horizontally arranged pivoted lever, and a crank pivoted to said lever and carrying at its free end a laterally projecting pin adapted to rest on said lever and to extend beneath the said vibrating arm.

23. In a type-writing machine, the combination with the base-plate and frame of the machine, of a transverse rock-shaft and a backward extending lever fast on said shaft; a key lever for depressing said lever by the depression of the key attached to said key lever; a post rising from said base-plate; a forward extending lever pivoted to said post; a reversible crank pivoted to this last named lever, and carrying at its free end a laterally projecting pin resting on said lever, beneath the backward extending lever, which rests on said pin; a slotted hollow standard rising from the said base-plate; a rack-toothed line-spacing rod supported and vertically movable within said standard; a vertical rod provided with a spring-controlled push-pawl for engagement with the rack-teeth on said line-spacing rod; an arm pivotally suspended from the said forward extending lever, and a lever centrally pivoted to a lug on the base-plate, one end of said lever being in engagement with said vertical rod, and the other end with said suspended arm.

24. In a typewriting machine, the combination with a platen, of a sector-shaped paper holder having swinging letter space movement on a vertical axis, and vertical line space movement.

25. In a typewriting machine, the combination with a platen, of a paper holder having swinging movement upon a vertical axis, relatively to the platen, for letter spacing, and vertical movement, relatively to the platen, for line spacing.

26. In a typewriting machine, the combination with a platen, of a sector-shaped paper holder having swinging letter space movement on a vertical axis and vertical line space movement, and two stationary, parallel, segmental paper guides, arranged concentrically with the axis of rotation of the said paper holder.

27. In a typewriting machine, the combination with a platen, of a sector-shaped paper holder having swinging letter space movement on a vertical axis and vertical line space movement, and means for securing the paper to the curved margin of said paper holder.

28. In a typewriting machine, the combination with a platen, of a sector-shaped paper holder having swinging letter space movement on a vertical axis and vertical line space movement; a spring applied to revolve the said paper holder; and an escapement device for controlling the movement of the paper holder under the action of said spring.

29. In a typewriting machine, the combination with a platen, of a sector-shaped paper holder having swinging letter-space movement on a vertical axis and vertical line space movement, and means for giving step by step vertical line space movement to said paper holder.

30. In a typewriting machine, the combination with a platen, of a sector-shaped paper holder having swinging letter space movement on a vertical axis and vertical line space movement; a spring applied to revolve the said paper holder in one direction, an escapement device for controlling the movement of the paper holder under the action of the said spring, and key-actuated means for returning the said paper holder to its starting point against the tension of said spring.

31. In a typewriting machine, the combination with a platen, of a sector-shaped paper holder having swinging letter space movement on a vertical axis and vertical line space movement, a spring applied to revolve the said paper holder in one direction, an escapement device for controlling the movement of the paper holder for letter-spacing under the action of said spring, and means operating to return the said paper holder to its starting point against the tension of said spring and also to lift the said paper holder step-by-step for line spacing.

32. In a typewriting machine, the combination with a platen, of a sector-shaped paper holder having swinging letter space movement on a vertical axis and vertical line space movement, a spring applied to revolve the said paper holder, an escapement device for controlling the movement of the paper holder under the action of said spring, and means acting upon the escapement device to disconnect the same from the paper holder and also to swing the said paper holder laterally to bring any part of the line of writing to the printing point.

33. In a typewriting machine, the combination with a platen, of a sector-shaped paper holder having swinging letter space movement on a vertical axis and vertical line space movement, key actuated means for lifting the said paper holder step-by-step for line spacing, and key actuated means for disengaging the said paper holder from the lifting means and permitting the same to drop by gravity.

34. In a typewriting machine, the combination with a platen, of a sector-shaped paper holder having swinging letter-space movement on a vertical axis and vertical line space movement, a spring applied to said paper holder to revolve the same in one direction, an escapement device for controlling the movement of the paper holder under the action of said spring, and key actuated means acting on said paper holder to revolve the same backwardly step-by-step against the tension of said spring.

35. In a typewriting machine, the combination with a platen, of a sector-shaped paper holder having swinging letter-space movement on a vertical axis and vertical line space movement, a two-part upright telescopic shaft, to one part of which the paper holder is attached and which has vertical movement therewith, and the other part of which has rotative movement only, a spring acting upon said shaft to turn same in one direction, an escapement device for controlling the rotative movement of said shaft under the action of said spring, and means for giving vertical step-by-step movement to the paper holder for line spacing.

36. A typewriting machine comprising a platen, a sector-shaped paper holder having swinging movement on a vertical axis, and vertical line spacing movement, a two-part upright telescopic shaft to one part of which the paper holder is attached and which has vertical movement therewith and the other part of which has rotative movement only, a spring acting on the said shaft to turn the same in one direction, an escapement mechanism controlling the rotative movement of said shaft under the action of said spring, and means acting on the sector bearing portion of said telescopic shaft for giving vertical step-by-step movement to the paper holder for line spacing.

37. In a typewriting machine, the combination with a platen, of a sector-shaped paper holder having swinging letter-space movement on a vertical axis and vertical line space movement, a hollow, upright, rotative shaft, a rod sliding endwise in and turning with said shaft, and bearing said sector-shaped paper holder, a vertically sliding lifting rod having rotative connection with said rotative paper holder bearing shaft, and means for giving vertical step-by-step movement to said lifting rod.

38. A typewriting machine comprising a platen, a sector-shaped paper holder having swinging letter-space movement on a vertical axis and vertical line spacing movement, key actuated means for disengaging the platen from the lifting means and permitting the same to drop by gravity, and means constituting an air cushion yieldingly arresting the downward movement of the said paper holder when dropped.

39. In a typewriting machine, the combination with a platen, of a sector-shaped paper holder having swinging letter-space movement on a vertical axis and vertical line space movement, a hollow, upright, rotative shaft, a rod bearing said paper holder, and sliding endwise in said hollow shaft, a vertically sliding rod having rotative connection with said sector bearing rod, means for lifting said vertically sliding rod step-by-step, means for disengaging said vertically sliding rod from said lifting means, and allowing it to drop by gravity, and means constituting an air cushion for yieldingly arresting the downward movement of said sliding rod.

40. In a typewriting machine, the combination with a platen, of a sector-shaped paper holder having swinging letter-space movement on a vertical axis and vertical line-space movement, an upright, rotative endwise movable rod to which said paper holder is attached, a vertically movable lifting rod provided with a rigidly attached arm, an adjusting screw engaged with said arm in line with said endwise movable rod, means affording rotative connection between said adjusting screw and the endwise movable rod, adapted to prevent relative endwise movement between said screw and rod, and means for giving vertical, step-by-step movement to said lifting rod.

In testimony that I claim the foregoing I have hereunto set my hand at Evansville in the county of Vanderburg and State of Indiana in the presence of two witnesses.

CHARLES S. NICKERSON.

Witnesses:
WILLIAM REISTER,
CLARA HOELL.